CONVERGENCE SYSTEMS FOR COLOR TELEVISION TUBES

Filed May 26, 1969

United States Patent Office 3,535,581

Patented Oct. 20, 1970

3,535,581

CONVERGENCE SYSTEMS FOR COLOR TELEVISION TUBES

Anthony David Newton, Enfield, England, assignor to British Radio Corporation Limited, Enfield, Middlesex, England Filed May 26, 1969, Ser. No. 827,664
Claims priority, application Great Britain, Oct. 23, 1968, 50,276/68
Int. Cl. H01j *29/50, 29/70*
U.S. Cl. 315—13 7 Claims

ABSTRACT OF THE DISCLOSURE

Dynamic convergence waveforms are generated from a saw-tooth waveform by integrating the saw-tooth waveform for ½ cycle commencing at the middle of each line scan and allowing the integrated waveform to decay to zero during the succeeding ½ cycle, whereby the dynamic convergence waveform can be accurately clamped to zero at the center of the screen.

This invention relates to convergence systems for color television tubes.

Conventional three-gun shadow mask television tubes have convergence coils mounted adjacent the three guns to permit adjustment of the beams so that they converge in the plane of the shadow mask, both in the center of the screen (static convergence) and in other parts of the screen (dynamic convergence). Waveforms of line and field frequency are applied to each of the convergence coils to effect this correction. The applied waveforms consist in the case of static convergence of D.C. signals and in the case of dynamic convergence of a combination of a parabolic waveform and a saw-tooth waveform. The parabolic waveform may be generated by integrating the saw-tooth waveform.

It is desirable for the value of the dynamic convergence waveforms to be zero at the center of the screen, otherwise adjustment of the dynamic convergence controls upsets the static convergence adjustments. Since a large number of adjustments are involved this can make the convergence procedure difficult and time consuming.

In generating the line-frequency component of the dynamic convergence waveforms, it has been proposed to connect the convergence circuit in series with the line deflection coils across the line output transformer. However, difficulty has been found in clamping at zero the D.C. level of the dynamic convergence waveforms at the center of the screen due to the low impedance of the circuitry requiring diodes with very low forward resistance and high current capability.

According to this invention there is provided a method of generating a line-scan convergence waveform for a shadow-mask television tube comprising generating a saw-tooth waveform which is in synchronism with the line scanning, integrating the saw-tooth waveform for half a cycle commencing substantially at the middle of each line scan and allowing the integrated waveform to decay to zero during the succeeding half-cycle of the saw-tooth waveform.

According to the invention there is also provided apparatus for use in convergence correction of a television tube comprising means for generating a saw-tooth waveform which is in operation in synchronism with the line scanning, means for integrating the saw-tooth waveform for half a cycle commencing substantially at the middle of each line scan and for allowing the integrated waveform to decay to zero during the succeeding half-cycle of the saw-tooth waveform, and one or more convergence coils connected to receive the integrated waveform.

Figure 1:
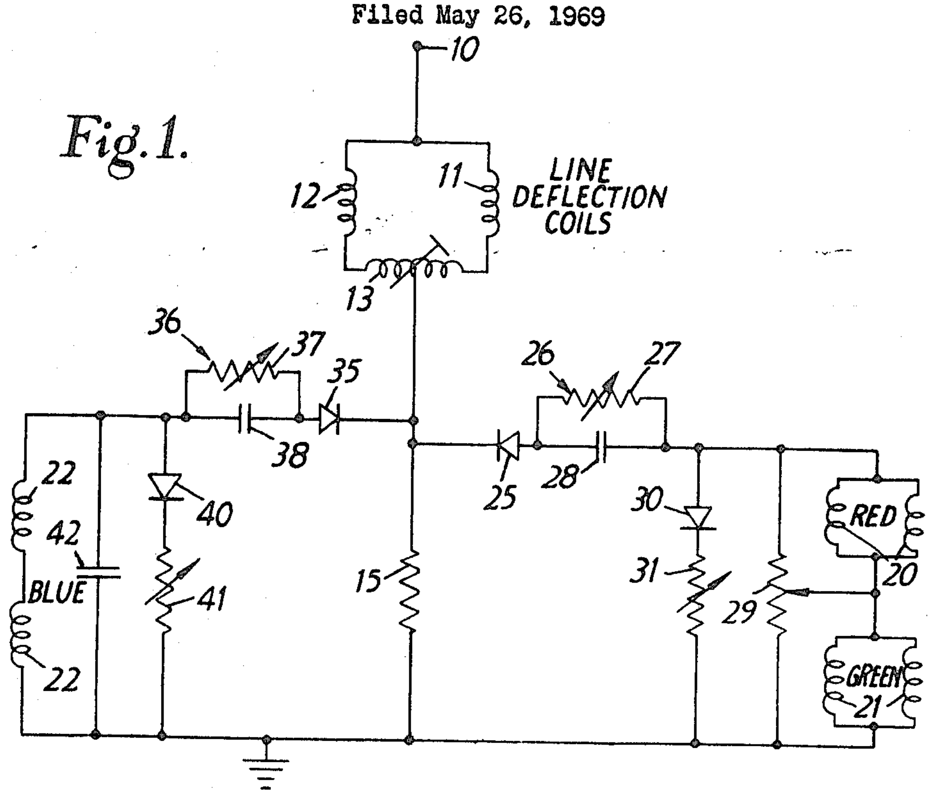
Figure 2:
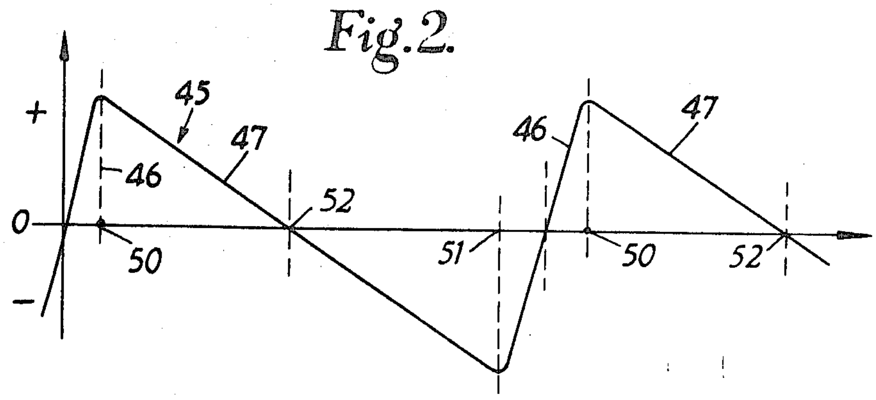
Figure 3:
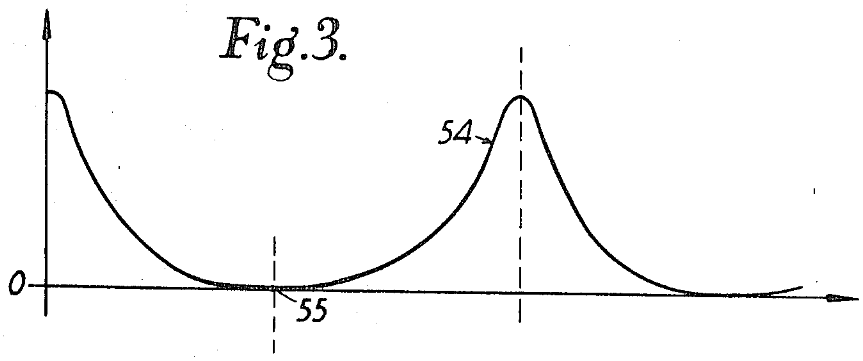

The invention will not be described in more detail, by way of example, with reference to the accompanying drawings, in which:

FIG. 1 is a circuit diagram of a convergence circuit embodying the invention; and FIGS. 2 and 3 show waveforms present within the circuit of FIG. 1 when in operation.

The circuit shown in FIG. 1 is the dynamic-convergence circuit for a color television receiver and has an input 10 for connection to the line output transformer of a color television receiver. The input is connected to two line deflection coils 11 and 12 the other ends of which are connected across asymmetry control 13.

The output of the symmetry control 13 is applied across a resistor 15. Across the resistor 15 are connected two circuits, the one to the right of resistor 15 (as seen in FIG. 1) including the red and green convergence coils 20 and 21 respectively and the one to the left of the resistor 15 including the blue convergence coils 22.

A diode 25 is connected to the output of the control 13 and a resistance-capacity circuit 26 is connected to the diode 25. The circuit 26 consists of a variable resistor 27 in parallel with a capacitor 28. The two red convergence coils 20 and the two green convergence coils 21 are each connected in parallel, and the coils are then connected in series with the coils 21 and in series with the circuit 26 and diode 25 across the resistor 15.

Across the convergence coils 20 and 21 there is connected a tapped resistor 29, the tap of which is movable and is connected to the junction of the red coils 20 and the green coils 21. Also across the coils 20 and 21 are connected a diode 30 and a variable resistor 31 in series.

The circuit including the two blue convergence coils 22, is in some respects similar to the circuit including the red and green coils, in that a diode 35, a resistance capacity circuit 36 and the coils 22 are connected in series across the resistor 15, and a diode 40 is connected in series with a resistance 41 across the coils 22. Also connected across the coils 22 is a capacitor 42.

In operation, the input 10 is connected to the line output transformer of the color television receiver in which the circuit is included. The output of the symmetry control 13 is a sawtooth waveform 45 and is illustrated in FIG. 2 which shows a plot of voltage against time for approximately 1½ line periods. The steep parts 46 of the waveform with positive gradient as seen in FIG. 2 correspond to flyback of the scanning spot, and the parts 47 with negative gradient correspond to the times when a line is being displayed. Thus the times indicated by the references 50 are the commencement of a line and the time indicated by 51 is the end of a line. The intersection of the negative-gradient part 47 of the waveform with the time axis corresponds to the times when the scanning spot is in the middle of the screen, and it is at these times that the dynamic-convergence waveforms must be kept at zero in order not to upset the static convergence adjustments, as previously described.

The diode 25 is so biased as to conduct only when the saw-tooth voltage 45 is negative. Thus the diode 25 commences conducting substantially at the middle of each line scan. The values of the resistor 27 and capacitor 28 forming the circuit 26 determine the exact point at which the diode 25 begins to conduct and thus the variable resistor 27 provides an amplitude control for the *R/G* convergence coils.

FIG. 3 shows the current 54 through the red or green convergence coils plotted against time on the same scale as FIG. 2. Diode 25 starts conducting at a time indicated by 55 shortly after the time 52 and the current begins to rise in non-linear manner due to the inductance of the coils 20 and 21. At the end of the scan diode 25 stops conducting and the current through the coils 20 and 21 decays during the subsequent half-cycle of the saw-tooth voltage through the diode 30 and variable resistor 31. Thus the resistor 31 varies the ratio of the amplitude of the waveforms through the coils 20 and 21 during alternate half-cycles of the saw-tooth waveform 45, and thus constitutes an *R/G* tilt control.

The variable resistor 29 varies the proportion of current throughout the cycle which passes through the red coils 20 and the green coils 21 and thus constitutes the *R/G* differential amplitude control.

It can be seen from the above that the diode 25 only conducts after the middle of the line scan and if the component values are correctly chosen the diode 30 will have ceased conducting by the middle of the line scan. Thus the waveforms are always at zero at the center of the scan. The red and green controls are matrixed to make adjustment easier.

The blue covergence circuit constituting the left-hand part of FIG. 1 operates in a substantially similar manner to the *R/G* circuit, the red and green coils 20 and 21 and the resistor 29 being replaced by the blue coils 22. The capacitor 42 is included in order to give a steeper parabolic current through the blue coils 22 than through the red and green coils 20 and 21. A similar capacitor may be included across the red and green coils to improve the current waveform so that it is more nearly parabolic.

The circuit illustrated may be modified by the addition of two capacitors, one in parallel with each of the resistors 31 and 41, in order to vary the slope of the waveform during the first half of each line scan, i.e. between times indicated by 50 and 52.

I claim:

1. Convergence correction apparatus for cathode ray tubes comprising in combination:

- a source of substantially sawtooth-shaped potential having a line scanning frequency;
- an impedance coupling said source to a potential reference level;
- a series connected first unidirectional conduction device and at least one convergence coil shunting said impedance; and a series connected second unidirectional conduction device and alterable resistor shunting said convergence coil whereby said first unidirectional conduction device commences conduction at the middle of each scan line and continues conduction for negative potentials developing non-linear current in said convergence coil and said second unidirectional conduction device conducts decaying non-linear current from said convergence coil during the subsequent half-cycle of said sawtooth-shaped potential.

2. The combination of claim 1 including a parallel connected capacitor and alterable resistor series connecting said first unidirectional conduction device and convergence coil.

3. The combination of claim 1 wherein said convergence coil includes series connected red and green convergence coils and an alterable resistor shunting said red and green convergence coils and having an adjustable arm coupled to the junction of said series connected red and green convergence coils.

4. The combination of claim 1 including a capacitor shunting said alterable resistor of said series connected second unidirectional conduction device and alterable resistor.

5. The combination of claim 1 wherein said impedance is in the form of a resistor and said first and second unidirectional devices are in the form of diodes.

6. The combination of claim 1 including a second series connected first unidirectional conduction device and at least one convergence coil shunting said impedance and a second series connected second unidirectional conduction device and alterable resistor shunting said convergence coil.

7. The combination of claim 6 wherein said convergence coil includes series connected blue convergence coils and a capacitor shunting said series connected blue convergence coils.

References Cited

UNITED STATES PATENTS

| | | | |
|---|---|---|---|
| 3,375,398 | 3/1968 | Ohlhorst | 315—13 |
| 3,414,758 | 12/1968 | Grue | 315—13 |
| 3,440,479 | 4/1969 | Brockmann | 315—13 |

RICHARD A. FARLEY, Primary Examiner

MALCOLM F. HUBLER, Assistant Examiner